United States Patent
Johnson

(10) Patent No.: US 10,569,388 B2
(45) Date of Patent: Feb. 25, 2020

(54) FIXTURE FOR HOLDING A PART DURING A MACHINING OPERATION

(71) Applicant: ROLLS-ROYCE PLC, London (GB)

(72) Inventor: Christopher R Johnson, Derby (GB)

(73) Assignee: ROLLS-ROYCE plc, London (GB)

( * ) Notice: Subject to any disclaimer, the term of this patent is extended or adjusted under 35 U.S.C. 154(b) by 273 days.

(21) Appl. No.: 15/596,518

(22) Filed: May 16, 2017

(65) Prior Publication Data

US 2017/0355065 A1    Dec. 14, 2017

(30) Foreign Application Priority Data

Jun. 13, 2016   (GB) .................................. 1610235.2

(51) Int. Cl.
| | | |
|---|---|---|
| B25B 1/00 | (2006.01) | |
| B25B 5/10 | (2006.01) | |
| B25B 5/00 | (2006.01) | |
| B23Q 3/06 | (2006.01) | |
| B25B 5/14 | (2006.01) | |
| B25B 1/24 | (2006.01) | |

(52) U.S. Cl.
CPC .............. *B25B 5/108* (2013.01); *B23Q 3/062* (2013.01); *B25B 5/006* (2013.01); *B25B 5/14* (2013.01); *B25B 1/2463* (2013.01)

(58) Field of Classification Search
CPC .. B25B 5/006; B25B 5/04; B25B 5/10; B25B 5/103; B25B 5/104; B25B 5/108; B25B 5/14; B25B 5/163; B25B 11/00; B23Q 3/06; B23Q 3/061; B23Q 3/062; B23Q 3/063; B23Q 3/064; B23Q 3/065; B23Q 3/066

USPC .......................... 269/55, 71, 157, 228, 281.1
See application file for complete search history.

(56) References Cited

U.S. PATENT DOCUMENTS

| | | | | |
|---|---|---|---|---|
| 1,560,748 A | * | 11/1925 | Wilderson | .............. B25B 5/006 269/120 |
| 3,039,332 A | * | 6/1962 | Johnson | .................. B23Q 3/06 408/87 |
| 3,145,746 A | * | 8/1964 | Scher | ..................... B29C 48/09 210/447 |

(Continued)

FOREIGN PATENT DOCUMENTS

| CN | 104400495 A | * | 3/2015 |
|---|---|---|---|
| CN | 104400495 A | | 3/2015 |

(Continued)

OTHER PUBLICATIONS

CN-104400495-A translation from Espacenet (Year: 2019).*
Nov. 18, 2016 Search Report issued in British Patent Application No. 1610235.2.

*Primary Examiner* — Lee D Wilson
(74) *Attorney, Agent, or Firm* — Oliff PLC

(57) ABSTRACT

A fixture for holding a part comprises a frame supporting a guide plate. A controlled engagement device passes through the guide plate and is arranged to be advanced incrementally towards a first end of a fulcrum beam. A second end of the fulcrum beam is connected to a linkage arm, the linkage arm passing through a gap in the guide plate. An end of the linkage arm distal to the fulcrum beam has a swivel clamp mounted thereto. A support is arranged to face the swivel clamp and defines a space there between, the space being configured to receive a part to be clamped in the fixture.

11 Claims, 4 Drawing Sheets

(56) References Cited

U.S. PATENT DOCUMENTS

| | | | | |
|---|---|---|---|---|
| 3,380,730 A | * | 4/1968 | Carver .................... | B25B 5/108 |
| | | | | 269/25 |
| 3,574,054 A | * | 4/1971 | Taylor, Jr. ............... | D21F 1/483 |
| | | | | 162/211 |
| 7,758,295 B2 | * | 7/2010 | Liu .......................... | B25B 5/10 |
| | | | | 248/125.2 |

FOREIGN PATENT DOCUMENTS

| | | |
|---|---|---|
| CN | 104440165 A | 3/2015 |
| CN | 204277525 U | 4/2015 |
| CN | 204353805 U | 5/2015 |

* cited by examiner

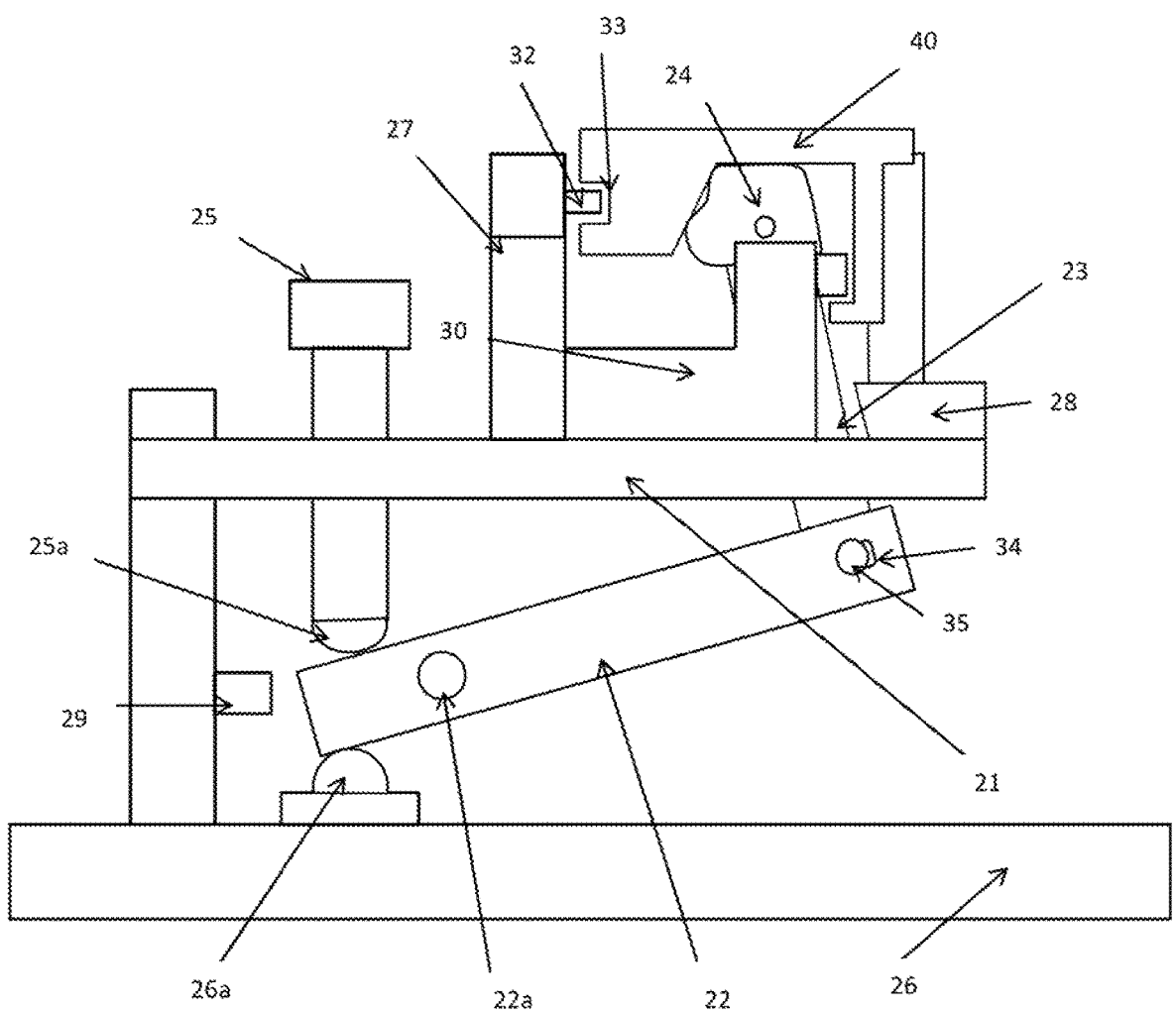

FIXTURE FOR HOLDING A PART DURING A MACHINING OPERATION

FIELD OF THE INVENTION

The present invention is concerned with a fixture for holding a part during a machining operation. More particularly, the invention is concerned with a fixture for holding a part which includes a hooked or lipped portion and holding said part securely in position whilst leaving the surfaces to be machined accessible. The invention has particular application (but is not strictly limited to) the machining of seal segment carriers for gas turbine engines.

BACKGROUND TO THE INVENTION

Gas turbine engine parts are conventionally manufactured by an investment casting process. This process inherently has limits on how accurately dimensions, in particular small dimensions, can be made. Consequently, it is known to undertake additional machining operations on cast parts to, for example, refine dimensions, provide more intricate detail in features and improve surface finishing of the part.

FIG. 1 shows a prior known fixture. As can be seen the fixture comprises a baseplate 1 having an orthogonally extending side wall 5. Three clamps are arranged to hold a part on one of three orthogonal planes X, Y and Z. A first clamp 6 clamping in an X-plane, a series of two clamps 2 and 3 clamping in a Y plane and a third clamp 4 clamping in a Z plane. The Y and Z clamps are pivotal into and out of position by means of pivot 2a, 3a, 4a and can be latched into position by means of catches 2b, 3b, 4b extending from the side wall 5 and baseplate 1. The third clamp Z also includes a hinge 4b allowing an end of the clamp to be raised and lowered with respect to the base plate 1. The X clamp is a screw jack clamp with a swivel face end allowing engagement onto an uneven surface.

As can be seen, little of a clamped part is left accessible. Consequently a part may need to be repositioned in to fixtures multiple times for performing multiple machining/finishing operations. This is both time consuming and, since no one datum is fixed in position, the results after multiple operations are variable. Consequently, quality and conformity of parts to a desired specification may not be consistent. Accurate location of small parts is particularly challenging.

It is an object of the invention to provide a fixture which can hold a part securely during machining operations and which provides access to multiple surfaces reducing the need for repositioning the part between multiple machining operations.

SUMMARY OF THE INVENTION

In accordance with the present invention there is provided a fixture for holding a part, the fixture comprising; a frame supporting a guide plate; a controlled engagement device passing through the guide plate and arranged to be advanced incrementally towards a first end of a fulcrum beam; a second end of the fulcrum beam connected to a linkage arm; the linkage arm passing through a gap in the guide plate; an end of the linkage arm distal to the fulcrum beam having mounted thereto a swivel clamp; a support arranged to face the swivel clamp and defining a space therebetween, the space configured to receive a part to be clamped in the fixture.

It will be understood that a fulcrum beam ("lever") is arranged to pivot about a pivot point ("fulcrum"). The controlled engagement device is arranged to engage with the fulcrum beam on a first side of the pivot point and the linkage arm is connected to the lever on a second side of the fulcrum.

For example, the controlled engagement device is a bolt and the guide plate comprises a threaded orifice into which a mating thread of the bolt engages, the fastener being advanceable by means of screwing the bolt into the threaded orifice. Optionally the controlled engagement device has a rounded surface at an end which advances towards the lever. Optionally, the frame includes a base plate towards which the controlled engagement device may advance whereby to clamp the component by advancing one end of the lever towards the base plate. The base plate may further include a rounded sprung plunger aligned with the axis of the controlled engagement device such that, on advancement of the controlled engagement device, the lever can be engaged between the base plate sprung plunger and the controlled engagement device.

The fixture may further include a cradle arranged in the space between the support and the swivel clamp into which a part may be received. The frame may further be supplied with guides or stops arranged to restrict non-rotational movement of the linkage arm and/or the lever.

Locators may be provided on the support and/or the cradle around which recesses in a part can be located. The locators may be arranged to serve as datum for machining of a part. The locators may be adjustable to allow accurate positioning of a datum. For example, adjustable locators comprise threaded barrels arranged on screws, screwing of the barrel in either direction allows repositioning of a datum.

The swivel clamp may be selectively shaped to provide a clamping force on appropriate surfaces of a part to be held in the fixture. The swivel clamp may include a replaceable pad such that pads of different shapes can be interchanged to suit different part geometries.

Optionally, the connection between the linkage arm and the lever is configured to allow the linkage arm to be repositioned relative to a fulcrum. For example, the connection comprises an elongate slot in the lever and a dowel which passes through the elongate slot and a dowel sized hole in the linkage arm. The dowel can slide to a desired position within the slot during clamping to allow the linkage arm to raise through the guide slot allowing movement of the linkage arm and lever together. In a further option, the linkage arm may comprise a plurality of sized holes to allow further configurations of the fixture. This can optionally use a bolt in place of a dowel and also could have the plurality of hole sizes within the lever and an oversized hole within the linkage arm to allow movement.

It will be appreciated that the fixture of the invention permits locking off of a part within the fixture by means of a single fastener. The arrangement uses the fulcrum and lever arrangement to apply a clamping force in a direction opposite to which the fastener is advanced against the lever. As the fastener is advanced it applies pressure to the lever which pivots on the fulcrum lifting the linkage arm. The arrangement locates the swivel clamp on the part repeatably to apply the required force to trap the part in place.

Materials and shape of the fixture can be varied to suit specific part geometries and materials. The required force to be applied by the clamp can be calculated for a given application. Balance dowels and additional guides/stops can be positioned to suit part machining requirements.

BRIEF DESCRIPTION OF DRAWINGS

An embodiment of the invention will now be further described with reference to the accompanying Figures in which;

FIG. 4 shows a side view of the embodiment of FIGS. 2 and 3 with a part clamped for machining.

FIG. 1 has been discussed above.

DETAILED DESCRIPTION OF DRAWINGS AND EMBODIMENTS

Figure 1:
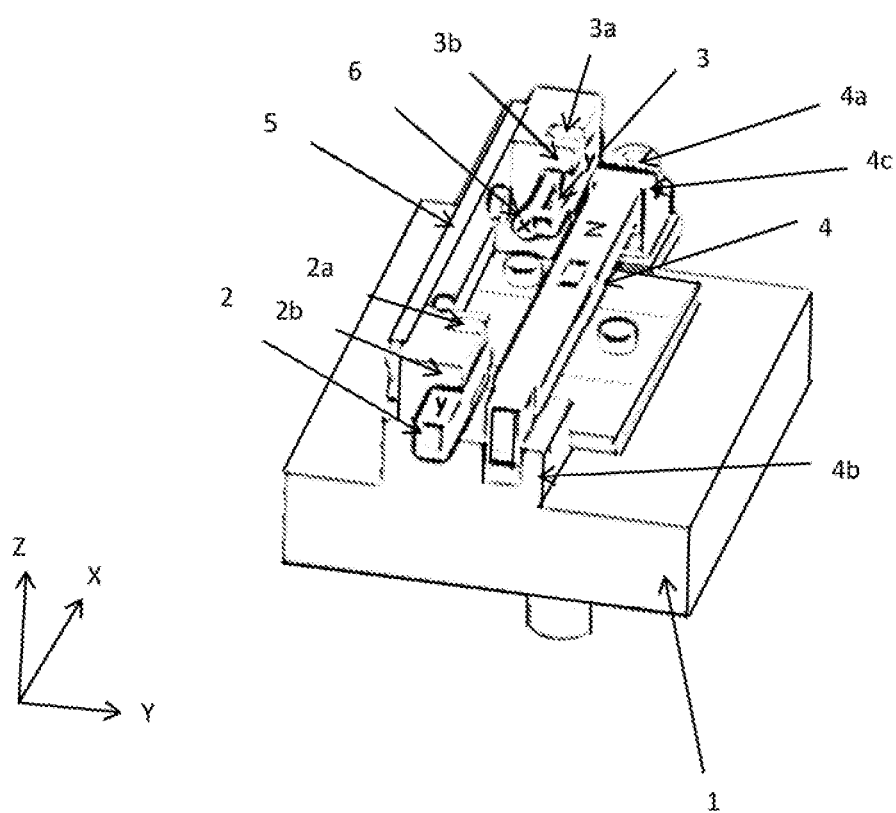
FIG. 1 shows a prior art fixture.
Figure 2:
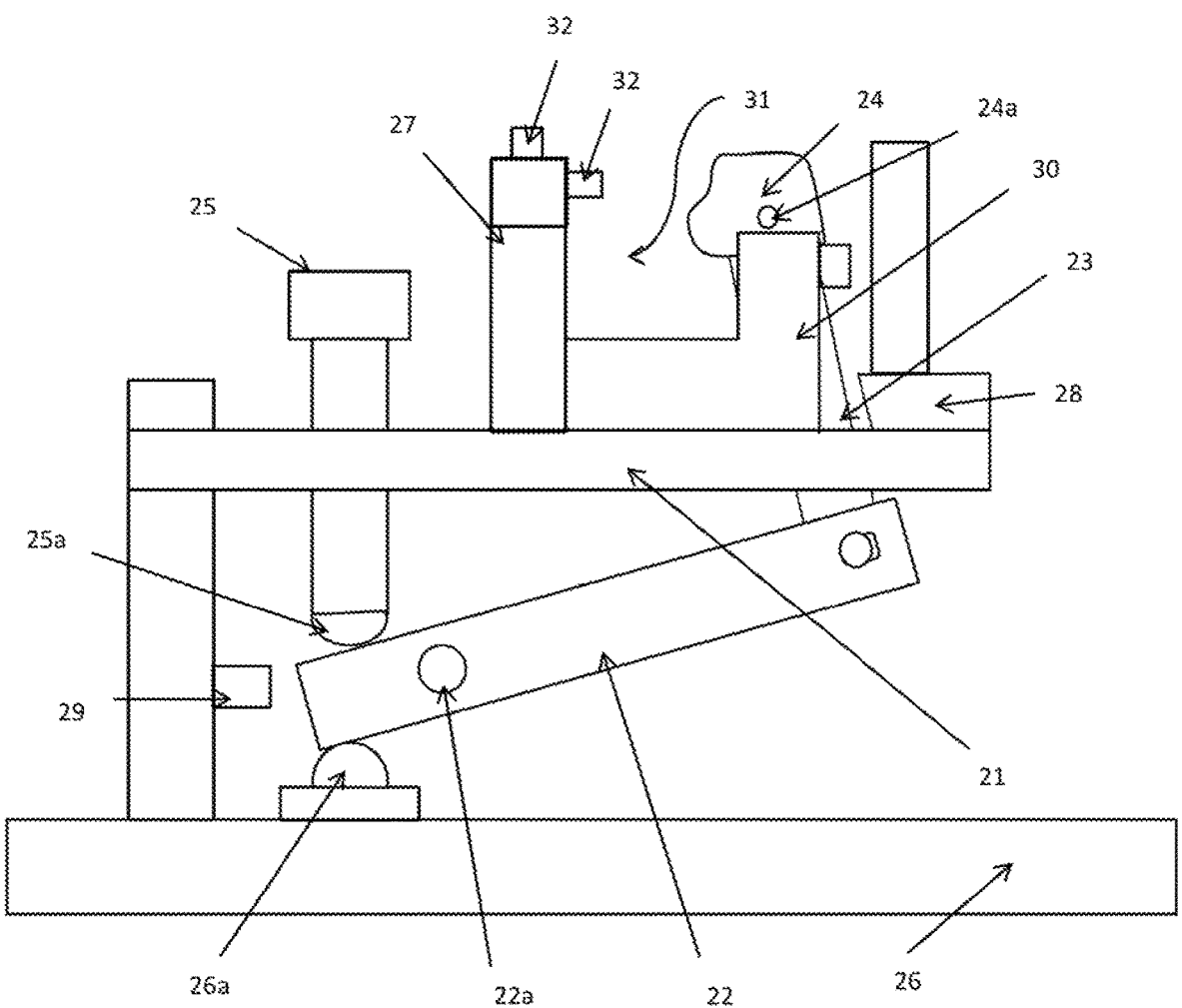
FIG. 2 shows a side view of an embodiment of a fixture in accordance with the invention.
Figure 3:
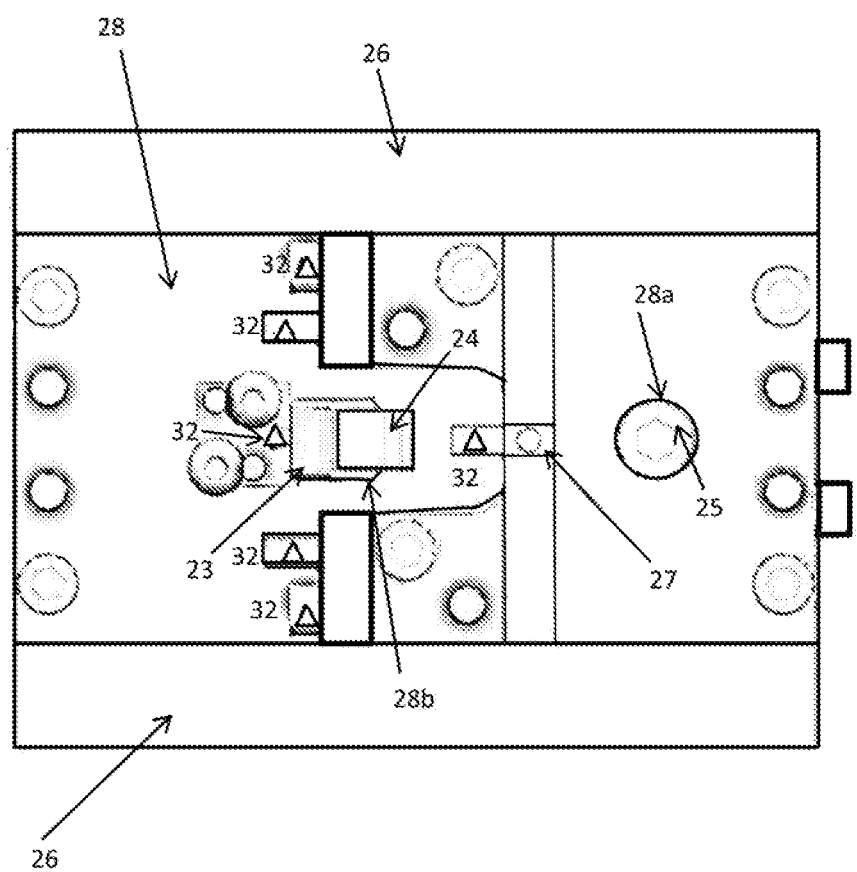
FIG. 3 shows a top view of the embodiment of FIG. 2.

The fixture of FIGS. 2 and 3 comprises a guide plate 21 having an aperture through which a controlled engagement device such as bolt 25 is threaded. The bolt 25 has a rounded end 25a which, when suitably advanced through the aperture engages with and pushes against a first end of a lever 22. A rounded sprung plunger 26a is fixed in axial alignment with the aperture and bolt 25 such that the lever 22 can be pushed against the sprung plunger 26a by the advancing bolt 25 until the mechanism is secured into a position against the component the sprung plunger 26a allows the lever 22 to return to its starting position once the controlled engagement device is retracted unclamping the component. The lever 22 is pivoted on fulcrum 22a. At the other end, the lever 22 attaches to a first end of a linkage arm 23 which passes through a gap 28b in the guide plate 21. At a second end of the linkage arm 23 a swivel clamp 24 is mounted for rotation about the fulcrum 24a.

As the bolt 25 is advanced, the lever 22 tilts and, by means of the linkage arm 23, advances the swivel clamp 24 towards a support 27. The support 27 and a cradle 30 define a space 31 into which a part can be located. As the swivel clamp 24 is advanced towards the support 27, it engages with a part located in the space 31 and secures the part in position. Optionally, the rotational position of the swivel clamp can be locked independently. Advancement of the bolt 25 secures the lever 22, linkage arm 23 and swivel clamp 24 in spatial position. Stop 28 locates the component within the X direction on the fixture. A part may be locatable onto locators 32 which can serve as a datum for subsequent manufacturing operations. Some or all of the locators 32 may be adjustable, for example by screwing a threaded barrel in opposite directions along an inner screw to allow accurate positioning of the datum.

FIG. 4 shows a part 40 in position in the fixture of FIGS. 2 and 3. As can be seen the part locates on locators 32 and around swivel clamp 24. By adjustment of the fastener 25, the swivel clamp 24 can be used to clamp the part 40 into position.

Relative to prior art arrangements, the fixture is more compact whilst robust and low maintenance. The simplicity of the arrangement permits quick, easy and repeatable loading. The arrangement leaves multiple surfaces of a part accessible to machine tools reducing the need to reposition the part between machining or finishing operations.

A further benefit of the arrangement arises from the use of linkages to put the required clamping force at a desired location on the part. This is in contrast to the use of maximum clamping forces which can result in surface damage to the part. The arrangement is particularly useful for providing repeatable loading against datum locations on hooked and lipped parts.

It will be understood that the invention is not limited to the embodiments above-described and various modifications and improvements can be made without departing from the scope of the invention as defined by the appended claims. Except where mutually exclusive, any of the features may be employed separately or in combination with any other features and the disclosure extends to and includes all combinations and sub-combinations of one or more features described herein.

The invention claimed is:

1. A fixture for holding a part, the fixture comprising:
a frame that includes a base plate and that supports a guide plate;
a controlled engagement device passing through the guide plate and arranged to be advanced incrementally towards a lever on a first side of a fulcrum so as to clamp the part by moving the lever on the first side of the fulcrum towards the base plate, the controlled engagement device being a bolt and the guide plate comprising a threaded orifice into which a mating thread of the bolt engages, the controlled engagement device being advanceable by way of screwing the bolt into the threaded orifice;
on a second side of the fulcrum, the lever being connected to a linkage arm, the linkage arm passing through a gap in the guide plate;
an end of the linkage arm distal to the lever having mounted thereto a swivel clamp; and
a support arranged to face the swivel clamp and defining a space therebetween, the space configured to receive the part to be clamped in the fixture, wherein
the base plate includes a rounded sprung plunger aligned with an axis of movement of the controlled engagement device such that the lever is configured to be engaged between the sprung plunger and the controlled engagement device when the controlled engagement device advances.

2. A fixture as claimed in claim 1, wherein the controlled engagement device has a rounded surface at an end which advances towards the lever on the first side of the fulcrum.

3. A fixture as claimed in claim 1, further comprising locators provided on the support and/or a cradle around which recesses in the part to be held in the fixture can be located.

4. A fixture as claimed in claim 3, wherein the locators are adjustable.

5. A fixture as claimed in claim 4, wherein the locators comprise threaded barrels arranged on screws, such that screwing of the barrel in either direction allows repositioning of a datum surface provided on an end of the barrel.

6. A fixture as claimed in claim 1, wherein the swivel clamp is selectively shaped to provide a clamping force on appropriate surfaces of the part to be held in the fixture.

7. A fixture as claimed in claim 1, wherein the connection between the linkage arm and the lever comprises sliding means configured to allow the linkage arm to be repositioned by sliding relative to the fulcrum.

8. A fixture as claimed in claim 7, wherein the connection comprises (i) an elongate slot in the lever, (ii) a dowel which passes through the elongate slot, and (iii) a reamed, dowel-sized hole in the linkage arm.

9. A fixture as claimed in claim 8, wherein the linkage arm comprises a plurality of bolt-sized holes to allow further configurations of the fixture.

10. A method of using a fixture to hold a part, the method comprising:
providing the fixture for holding the part, the fixture comprising:
a frame that includes a base plate and that supports a guide plate;
a controlled engagement device passing through the guide plate and arranged to be advanced incrementally towards a lever on a first side of a fulcrum so as to clamp the part by moving the lever on the first side of the fulcrum towards the base plate, the controlled engagement device being a bolt and the guide plate comprising a threaded orifice into which a mating thread of the bolt engages, the controlled engagement device being advanceable by way of screwing the bolt into the threaded orifice;

on a second side of the fulcrum, the lever being connected to a linkage arm, the linkage arm passing through a gap in the guide plate;

an end of the linkage arm distal to the lever having mounted thereto a swivel clamp; and a support arranged to face the swivel clamp and defining a space therebetween, the space configured to receive the part to be clamped in the fixture, the base plate including a rounded sprung plunger aligned with an axis of movement of the controlled engagement device such that the lever is configured to be engaged between the sprung plunger and the controlled engagement device when the controlled engagement device advances, aligning and securing the part so as to leave multiple surfaces of the part accessible for machining, and performing multiple machining operations on the part without repositioning the part in the fixture.

11. A method according to claim 10, wherein the part comprises a hook/lip and the hook/lip is arranged around the swivel clamp.

\* \* \* \* \*